(12) United States Patent
Katsurahira

(10) Patent No.: US 8,847,928 B2
(45) Date of Patent: Sep. 30, 2014

(54) COIL, POSITION INDICATOR, POSITION DETECTING DEVICE, AND COIL WINDING METHOD

(75) Inventor: Yuji Katsurahira, Saitama (JP)

(73) Assignee: Wacom Co., Ltd., Saitama (JP)

( * ) Notice: Subject to any disclaimer, the term of this patent is extended or adjusted under 35 U.S.C. 154(b) by 824 days.

(21) Appl. No.: 12/912,092

(22) Filed: Oct. 26, 2010

(65) Prior Publication Data

US 2011/0115753 A1  May 19, 2011

(30) Foreign Application Priority Data

Nov. 17, 2009  (JP) .................................. 2009-262296

(51) Int. Cl.
*G09G 3/30* (2006.01)
*H01F 5/00* (2006.01)
*G06F 3/0354* (2013.01)
*G06F 3/046* (2006.01)
*H01F 41/06* (2006.01)
*H01Q 7/08* (2006.01)

(52) U.S. Cl.
CPC .............. *H01F 41/0641* (2013.01); *H01F 5/00* (2013.01); *G06F 3/03545* (2013.01); *G06F 3/046* (2013.01); *H01Q 7/08* (2013.01)
USPC .............................. 345/179; 336/15; 336/188

(58) Field of Classification Search
CPC ............ G06F 3/044; G06F 3/046; H01F 5/00
USPC ..................... 345/179; 336/15, 188
See application file for complete search history.

(56) References Cited

U.S. PATENT DOCUMENTS

| 4,878,553 | A | | 11/1989 | Yamanami et al. | |
|---|---|---|---|---|---|
| 5,061,891 | A | * | 10/1991 | Totsuka et al. | 324/146 |
| 5,261,615 | A | | 11/1993 | Cuttelod | |
| 5,565,836 | A | * | 10/1996 | Groehl et al. | 336/225 |
| 5,579,887 | A | * | 12/1996 | Leibu et al. | 194/317 |
| 5,640,970 | A | | 6/1997 | Arenas | |
| 5,679,930 | A | | 10/1997 | Katsurahira | |
| 2007/0227785 | A1 | * | 10/2007 | Katsurahira | 178/18.07 |

FOREIGN PATENT DOCUMENTS

| EP | 0 587 201 A1 | 3/1994 |
|---|---|---|
| EP | 1 094 497 A2 | 4/2001 |
| EP | 1 643 351 A2 | 4/2006 |

(Continued)

OTHER PUBLICATIONS

Extended European Search Report dated Feb. 18, 2014, for corresponding European Application No. 10191525.4-1556, 11 pages.

*Primary Examiner* — Stephen Sherman
*Assistant Examiner* — Randal Willis
(74) *Attorney, Agent, or Firm* — Seed IP Law Group PLLC

(57) ABSTRACT

A position indicator for use in a pen tablet device includes a coil for emitting a position indicating signal. The coil includes: a first conductive wire wound from a distal end portion thereof to a proximal end portion thereof in a predetermined rotational direction; and a second conductive wire wound from a proximal end portion thereof to a distal end portion thereof in the predetermined rotational direction, wherein the first conductive wire and the second conductive wire are connected to each other at the proximal end portions thereof, and the wound first conductive wire and the wound second conductive wire are disposed alternately adjacent to each other.

12 Claims, 7 Drawing Sheets

(56) References Cited

FOREIGN PATENT DOCUMENTS

| EP | 1 806 647 A2 | 7/2007 |
| EP | 1 837 744 A2 | 9/2007 |
| JP | 63070326 A | 3/1988 |
| JP | 05275283 A | 10/1993 |
| JP | 7175572 A | 7/1995 |
| JP | 9-223639 A | 8/1997 |
| JP | 2007164356 A | 6/2007 |
| JP | 2007257359 A | 10/2007 |

* cited by examiner (PRIOR ART)

COIL, POSITION INDICATOR, POSITION DETECTING DEVICE, AND COIL WINDING METHOD

CROSS REFERENCE TO RELATED APPLICATIONS

The present application claims the benefit under 35 U.S.C. 119 of Japanese Patent Application No. 2009-262296, filed Nov. 17, 2009, the entire content of which is being incorporated herein by reference.

BACKGROUND OF THE INVENTION

1. Field of the Invention

The present invention relates in general to a coil which is suitable for use in detecting a position indicated by a position indicator in accordance with an electromagnetic induction method (hereinafter referred to as "an indicated position" for short), a position indicator, a position detecting device, and a coil winding method.

2. Description of the Related Art

Heretofore, the techniques disclosed in Japanese Patent Laid-Open Nos. Sho 63-70326 (hereinafter referred to as Patent Document 1) and Hei 7-175572, respectively, have been known as ones each relating to a position detecting device for detecting an indicated position in accordance with an electromagnetic induction method. These techniques are such that a coil is provided in a position indicator and a sensor coil is provided in the position detecting device, and under this condition, a signal based on an electromagnetic wave is transmitted and received between the position detecting device and the position indicator, whereby the position detecting device detects the indicated position.

In recent years, with the advancement in practical realization of a liquid crystal display device, it has become desirable to have a position detecting device in which the position detecting device is combined with the liquid crystal display device, such that a position at which the drawing is desired to be carried out is directly indicated with a pen, thereby making it possible to input drawing information or the like. A position detecting device disclosed in Japanese Patent Laid-Open No. 2007-257359 (hereinafter referred to as Patent Document 2), for example, is known as such a position detecting device. With this position detecting device, a magnetic field component of a signal generated by a coil of a position indicator is detected by a sensor coil disposed in a front surface of a liquid crystal panel.

In addition, a construction of the position indicator used in the technique disclosed in Patent Document 2 is described in Japanese Patent Laid-Open No. 2007-164356 (hereinafter referred to as Patent Document 3). Each of the techniques disclosed in Patent Documents 2 and 3, respectively, is such that a power source is provided in the position indicator and an AC magnetic field is generated from a coil, and thus an indicated position on a liquid crystal panel is detected in accordance with an electromagnetic induction method between the AC magnetic field and the sensor coil made of a transparent conductive material (ITO film) and disposed on a front surface of the liquid crystal panel.

SUMMARY OF THE INVENTION

With the position detecting device disclosed in Patent Document 2, the magnetic field component generated by the coil of the position indicator is detected by the sensor coil disposed on the front surface of the liquid crystal panel. FIG. 10 shows an example of a coil used in an existing position indicator disclosed in Patent Document 2 or the like. The coil 101 used in an existing position indicator, as shown in FIG. 10, is made by winding a conductive wire 103 around a ferrite core 102. With the position detecting device, the AC magnetic field transmitted from the coil 101 is detected by a sensor coil disposed in parallel relation to a tablet, thereby obtaining the indicated position.

However, with the existing position indicator, the AC voltage is applied to the coil 101, whereby the entire coil 101 acts as an electrode, thus generating an AC electric field. Based on the generated AC electric field, induced voltages due to the electrostatic induction are generated in each of plural lines of the sensor coil of the tablet.

At this time, when a resistance value of the sensor coil is sufficiently low, the voltages induced in the respective lines become approximately uniform. For this reason, an influence of the electrostatic induction between the position indicator and the sensor coil can be canceled by using a differential amplifier or the like. However, when the ITO film is used in the sensor coil for the purpose of realizing a transparent sensor, the resistance value of the sensor coil becomes as high as several kilo ohms to several tens of kilo ohms.

In this case, since the electrostatic induced voltages generated in the respective lines are different from one another depending on a distance from the coil of the position indicator, this difference in electrostatic induced voltages exerts an influence on a detected value when the AC magnetic field described above is detected by the sensor coil. As a result, it is difficult to precisely detect the indicated position indicated by the position indicator.

The present invention is directed to providing a position indicator for use on a sensor coil having a high electrical resistance, whose indicated position is detected in accordance with an electromagnetic induction method, wherein an influence of the electrostatic induction between the position indicator and the sensor coil is excluded to thereby allow accurate detection of the indicated position. In accordance with other aspects, the present invention also provides a coil used in such a position indicator, a position detecting device used with such a position indicator, and a coil winding method.

According to an embodiment of the present invention, there is provided a coil including: a first conductive wire wound from a distal end portion thereof to a proximal end portion thereof in a predetermined rotational direction; and a second conductive wire wound from a proximal end portion thereof to a distal end portion thereof in the predetermined rotational direction; in which the first conductive wire and the second conductive wire are connected to each other at the proximal end portions thereof; and the wound first conductive wire and the wound second conductive wire are disposed alternately adjacent to each other.

According to another embodiment of the present invention, there is provided a position indicator including: an oscillation circuit configured to transmit a position indicating signal in order to indicate a position. The oscillation circuit includes a coil, which further includes a first conductive wire wound from a distal end portion thereof to a proximal end portion thereof in a predetermined rotational direction; and a second conductive wire wound from a proximal end portion thereof to a distal end portion thereof in the predetermined rotational direction; in which the first conductive wire and the second conductive wire are connected to each other at the proximal end portions thereof; and the wound first conductive wire and the wound second conductive wire are disposed alternately adjacent to each other.

According to still another embodiment of the present invention, there is provided a position detecting device including: a position indicator including a coil for radiating a magnetic field for carrying out position indication; and a tablet including an input surface for receiving position indication made by the position indicator. The tablet is configured to detect a position indicated by the position indicator on the input surface in accordance with a magnetic field emitted from the position indicator. The coil includes a first conductive wire wound from a distal end portion thereof to a proximal end portion thereof in a predetermined rotational direction; and a second conductive wire wound from a proximal end portion thereof to a distal end portion thereof in the predetermined rotational direction.

According to yet another embodiment of the present invention, there is provided a position detecting device including: a position indicator including an oscillation circuit that includes a coil configured to emit a position indicating signal representing an indicated position; and a tablet including an input surface for receiving position indication made by the position indicator. Specifically, the tablet is configured to detect a position indicated by the position indicator on the input surface in accordance with a position indicating signal emitted from the position indicator. The coil includes a first conductive wire wound from a distal end portion thereof to a proximal end portion thereof in a predetermined rotational direction, and a second conductive wire wound from a proximal end portion thereof to a distal end portion thereof in the predetermined rotational direction, in which the first conductive wire and the second conductive wire are connected to each other at the proximal end portions thereof and the wound first conductive wire and the wound second conductive wire are disposed alternately adjacent to each other. The coil is configured to transmit the position indicating signal.

According to a further embodiment of the present invention, there is provided a coil winding method including the steps of: designating a portion of a conductive wire from one predetermined point thereof to one end portion thereof as a first conductive wire, and designating another portion of the conductive wire from said one predetermined point to the other end portion thereof as a second conductive wire; fixing said one predetermined point of the conductive wire to a magnetic material having approximately a rod-like shape; winding the first conductive wire by a half turn in a first rotational direction, and winding the second conductive wire by a half turn in a second rotational direction, thereby placing the second conductive wire over the first conductive wire; and alternately winding the first conductive wire and the second conductive wire, for example along the last-wound conductive wire per each turn, to repetitively wind the first conductive wire and the second conductive wire by a predetermined number of turns. After the repetitive winding is completed, both end portions of the conductive wire are taken as both ends of the coil.

According to the present invention, the voltages which are opposite in polarity to each other and which have approximately the same potential are applied to the wound conductive wires that are adjacent to each other. For this reason, the electric fields generated from the conductive wires adjacent to each other cancel each other, and thus it is possible to suppress the radiation of the electric field from the coil.

In addition, when the coil is used in the position indicator, the sensor coil of the tablet can detect only the signal generated by the electromagnetic induction without being influenced by the electrostatic induction between the sensor coil and the position indicator. Thus, it is possible to precisely obtain the coordinates of the position indicator on the tablet.

DETAILED DESCRIPTION OF THE PREFERRED EMBODIMENTS

The preferred embodiments of the present invention will be described in detail hereinafter with reference to the accompanying drawings.

<First Embodiment>

A first embodiment of the present invention will now be described.

<Construction of a Coil>

Figure 1:
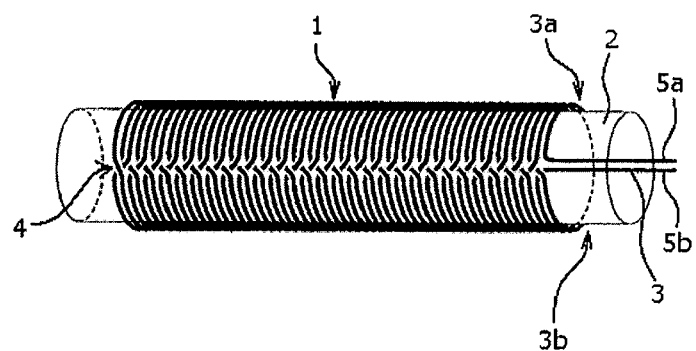
FIG. 1 is an external view showing a construction of a coil according to a first embodiment of the present invention.

FIG. 1 shows a coil winding wire of a first embodiment of the present invention.

A conductive wire 3 that forms a coil 1 has a predetermined length. A predetermined portion of the conductive wire 3 is determined as a middle point 4, and both end portions of the conductive wire 3 with respect to the middle point 4 are designated as a first end portion 5a and a second end portion 5b, respectively. Also, a part of the conductive wire 3 extending from the middle point 4 to the first end portion 5a is designated as a first conductive wire 3a, and a part of the conductive wire 3 extending from the middle point 4 to the second end portion 5b is designated as a second conductive wire 3b.

With regard to the concept about how to wind the coil, the first conductive wire 3a is wound from its one end portion (e.g., a distal end portion) to the other end portion (e.g., a proximal end portion near the middle point 4) in a predetermined rotational direction. After being wound up to the other end portion, the conductive wire 3 is folded back at the middle point 4 to be returned as the second conductive wire 3b back to the one end portion in the same rotational direction. In this case, the wound first conductive wire 3a and the wound second conductive wire 3b are disposed alternately adjacent to each other in respective portions of the coil 1.

<Position Indicator>

Figure 2:
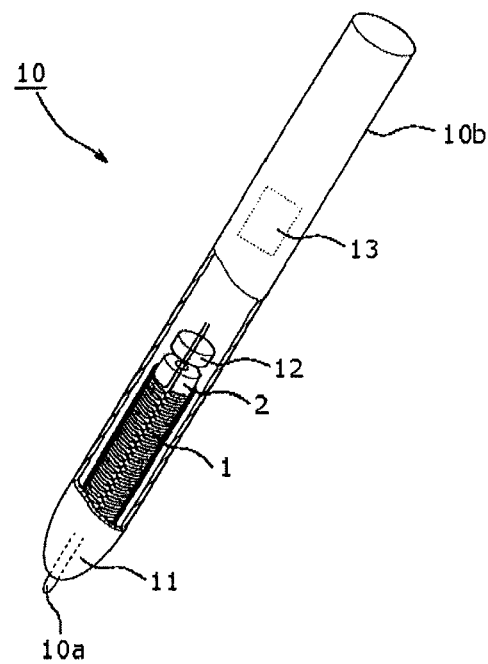
FIG. 2 is a partially cut away view showing an internal construction of a position indicator having the coil according to the first embodiment of the present invention.

FIG. 2 shows a position indicator 10 having the coil 1 according to the first embodiment of the present invention.

The position indicator 10 having the coil 1 according to the first embodiment of the present invention includes a pen tip portion 10a, a pen holder 10b, the coil 1, a pen pressure sensor 12 for detecting a pen pressure applied to the pen tip portion 10a, and an oscillation circuit 13 (which cooperates with and functionally includes the coil 1).

The coil 1 of the first embodiment is formed by using a special method of winding (knitting) the conductive wire 3 (refer to FIG. 7, which will be described later) around the circumference of a ferrite core 2, and a winding process will be described later. The coil 1 and the ferrite core 2 are disposed close to the pen tip portion 10a. The pen tip portion 10a is provided at a distal end of a rod 11, which is inserted through a hole formed through the tip side of the pen holder 10b. The coil 1 is structured by winding a litz wire around the ferrite core 2, which includes a hole through which the rod 11 is slidably inserted. The coil 1 is disposed on the tip side of the pen holder 10b.

The oscillation circuit 13, functionally including and cooperating with the coil 1, generates an AC signal, and transmits a position indicating signal to a tablet 31 (refer to FIG. 8, which will be described later) via the coil 1. A battery may be used as a power source built in the position indicator 10. Alternatively, as described in Patent Document 2, the power source which is charged by an excitation signal supplied thereto from the tablet 31 may also be used as the power source built in the position indicator 10.

The pen pressure sensor 12 is composed of a variable capacitance capacitor, an example of which is disclosed in Japanese Patent Laid-Open No. Hei 5-275283. Thus, an oscillation frequency may be changed in accordance with the pen pressure. Alternatively, by using the method as disclosed in Patent Document 1, the pen pressure may be converted into a binary code, and a signal generated in the coil 1 may be modulated by using the binary code.

<Coil in Colpitts Oscillation Circuit>

Figure 3:
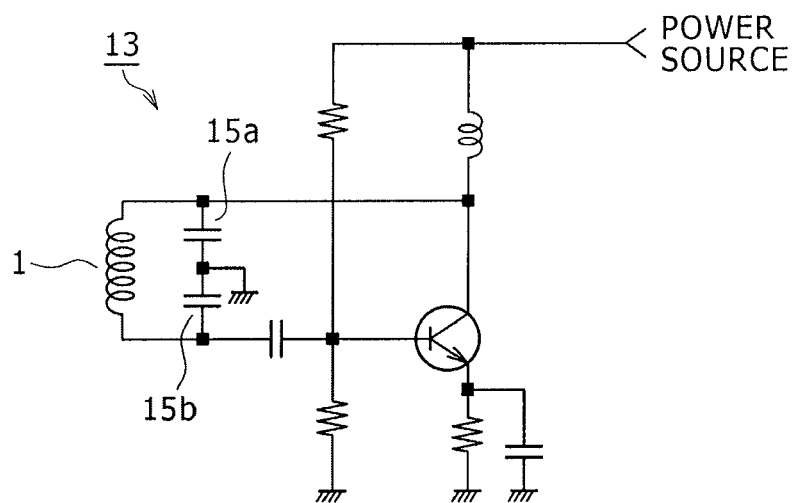
FIG. 3 is a circuit diagram showing a Colpitts type oscillation circuit used in the position indicator having the coil of the first embodiment.

FIG. 3 is a circuit diagram of a Colpitts type oscillation circuit used in the position indicator 10 having the coil 1 of the first embodiment.

The oscillation circuit 13 of the position indicator 10 having the coil 1 of the first embodiment includes two capacitors 15a and 15b connected in series with each other, and the coil 1 connected in parallel with the two capacitors 15a and 15b, and is configured in the form of the well-known Colpitts type oscillation circuit. The two capacitors 15a and 15b are equal in electrostatic capacitance to each other, and a middle point to which each of the capacitors 15a and 15b is connected is connected to a predetermined fixed potential (a minus terminal of a power source (GND) in this case). In the Colpitts type oscillation circuit thus configured, signals which have the same amplitude, with respect to the GND potential as a reference, and which are 180° out-of-phase with each other are generated at both ends of the coil 1 or, more specifically, both ends of the conductive wire 3 that forms the coil 1, respectively.

Figure 4:
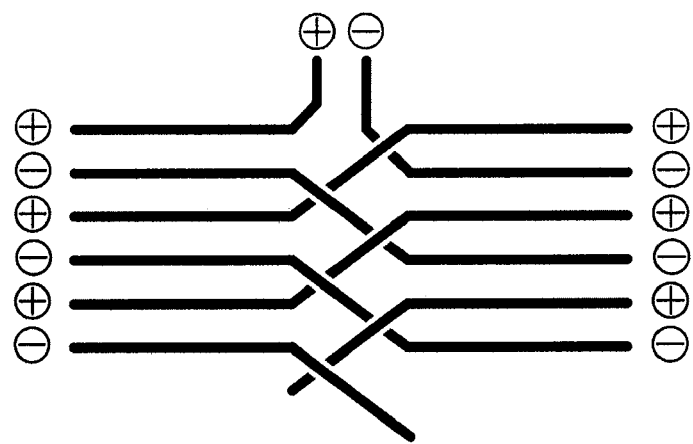
FIG. 4 is an explanatory view showing the basic principle of the coil of the present invention.

At this time, the voltages generated in the coil 1 are as shown in FIG. 4. Specifically, since the plus-side voltage and the minus-side voltage are alternately generated in each adjacent two winding wires of the coil 1, the electric fields radiated by each adjacent two winding wires cancel each other, to thus exert no influence to the surrounding. This is a feature of the present invention.

According to the first embodiment of the present invention described above, the position indicator 10 includes the coil 1 in which the first and second conductive wires 3a and 3b are wound, from the starting end side and the terminating end side of the conductive wire 3, respectively, so as to be alternately adjacent to each other, per each turn. Therefore, the electric fields radiated from each adjacent two portions of the conductive wire 3 of the coil 1 cancel each other, to thereby reduce the radiation of the electric field from the coil 1.

In addition, since the Colpitts type oscillation circuit is used in the position indicator 10 having the coil 1 of the first embodiment, the signals which have the same amplitude and which are 180° out-of-phase with each other are generated at both ends of the conductive wire 3, respectively. Therefore, since the electric fields radiated by each adjacent two portions of the conductive wire 3 of the coil 1 fully cancel each other, it is possible to realize the position indicator which radiates very little electric field.

For this reason, the tablet 31 is free from the influence of the electrostatic induction between the positive indicator 10 and the sensor coil, and thus can precisely detect the indicated position indicated by the position indicator 10 on the sensor coil having a high electrical resistance.

<Second Embodiment>

A second embodiment of the present invention will now be described.

In the second embodiment of the present invention, a description will be given below with respect to the case where the present invention is applied to a coil 21 in which a middle point terminal 22 is drawn out from the middle point 4 of the conductive wire 3 wound around the ferrite core 2. In the following description, portions corresponding to those shown in FIGS. 1 to 4 described in the first embodiment are designated by the same reference numerals, respectively, and a detailed description thereof is omitted here for the sake of simplicity.

Figure 5:
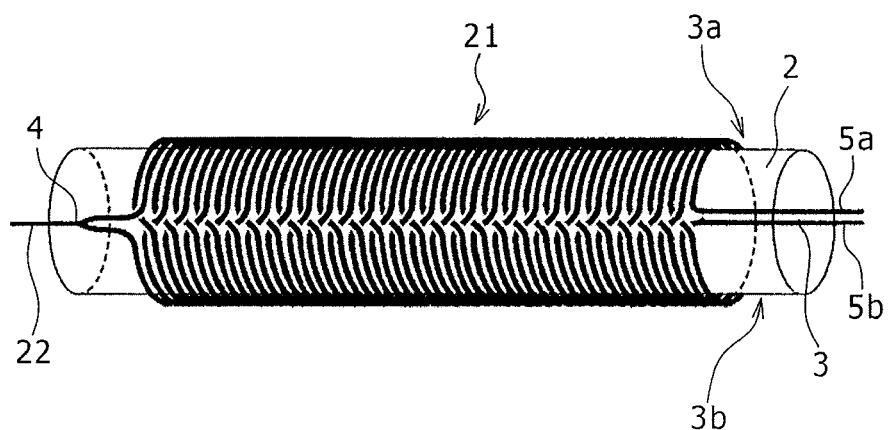
FIG. 5 is an external view showing a coil according to a second embodiment of the present invention.

FIG. 5 is a view showing a coil winding wire of the coil 21.

The coil 21 of the second embodiment is different from the coil 1 of the first embodiment in that in the coil 21, the middle point terminal 22 is drawn out from the middle point 4 of the conductive wire 3.

Figure 6:
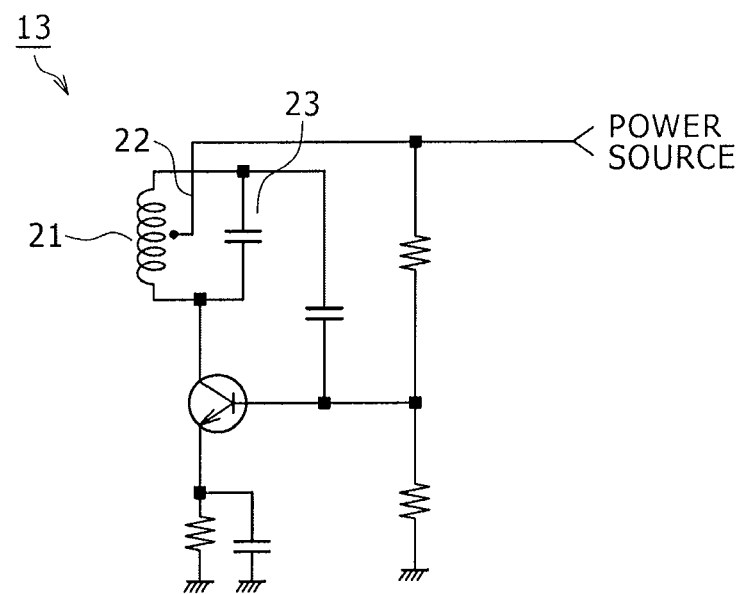
FIG. 6 is a circuit diagram showing a Hartley type oscillation circuit used in a position indicator having the coil of the second embodiment.

FIG. 6 is a circuit diagram of a Hartley type oscillation circuit used in the position indicator 10 having the coil 21 of the second embodiment.

In the oscillation circuit 13 of the position indicator 10 having the coil 21 of the second embodiment, one capacitor 23 is connected in parallel with the coil 21, to thereby form the well-known Hartley type oscillation circuit. A middle point terminal 22 connected to the middle point 4 of the coil 21 is connected to a predetermined fixed potential (a plus terminal of the power source (VCC) in this case).

In the Hartley type oscillation circuit, signals which have the same amplitude, with respect to the VCC potential as a reference, and which are 180° out-of-phase with each other are generated at both ends of the coil 21 or, more specifically, at both ends of the conductive wire 3 that forms the coil 21, respectively. At this time, as shown in FIG. 4 described above, the plus-side voltage and the minus-side voltage are alternately generated in each adjacent two winding wires of the coil 21.

In the second embodiment as well, the position indicator 10 includes the coil 21 in which the first and second conductive wires 3a and 3b are wound, from the starting end side and the terminating end side of the conductive wire 3, respectively, so as to be alternately adjacent to each other, per each turn. Therefore, the electric fields radiated from each adjacent two portions of the conductive wire 3 of the coil 21 cancel each other, to thereby reduce the radiation of the electric field from the coil 21. In addition, since the Hartley type oscillation circuit is used in the position indicator 10 having the coil 21 of the second embodiment, the signals which have the same amplitude, with respect to the potential at the middle point 22 as a reference, and which are 180° out-of-phase with each other are generated at both ends of the conductive wire 3, respectively. Thus, it is possible to realize the position indicator which radiates very little electric field because the electric fields radiated from each adjacent two portions of the conductive wire 3 of the coil 21 fully cancel each other.

For this reason, a resulting effect is that even when the sensor coil having a high electrical resistance is used in the tablet 31, the influence of the electrostatic induction between the position indicator 10 and the sensor coil is removed, and thus it is possible to precisely detect the indicated position of the position indicator 10 on the tablet 31.

<Method of Winding a Conductive Wire>

FIGS. 7A to 7F are views explaining processes for manufacturing the coil 1 of the first embodiment shown in FIG. 1.

Figure 7A:
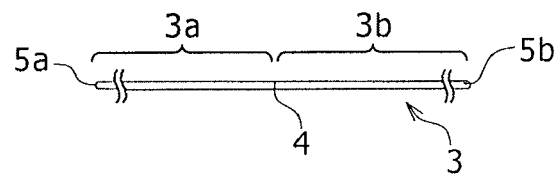
FIGS. 7A to 7F are views explaining a method of winding the coil according to the first embodiment of the present invention.

FIG. 7A shows a construction of the conductive wire 3.

The conductive wire 3 in this case has a predetermined length, and both end portions of the conductive wire 3 with respect to the middle point 4 are designated as the first end portion 5a and the second end portion 5b, respectively. Also, a part of the conductive wire 3 extending from the middle point 4 to the first end portion 5a is designated as the first conductive wire 3a, and a part of the conductive wire 3 extending from the middle point 4 to the second end portion 5b is designated as the second conductive wire 3b.

Figure 7B:
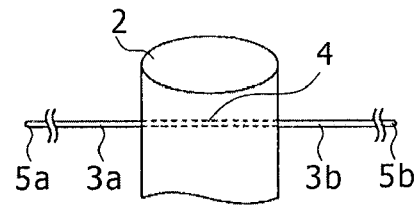

FIG. 7B shows a state in which the ferrite core 2 is placed over the middle point 4 of the conductive wire 3.

In the process for manufacturing the coil 1 in this case, the conductive wire 3 starts to be wound around the ferrite core 2 in a state shown in FIG. 7B.

Figure 7C:
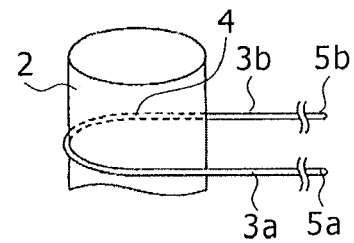

FIG. 7C shows a state in which the first conductive wire 3a is wound around the ferrite core 2 by a half turn. At this time, the first conductive wire 3a is wound along the circumference of the ferrite core 2 by a half turn.

Figure 7D:
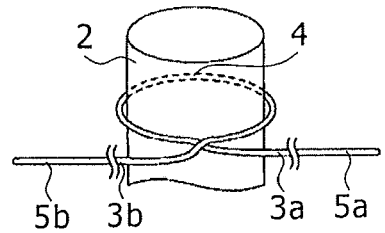

FIG. 7D shows a state in which the second conductive wire 3b is wound around the ferrite core 2 by a half turn. At this time, the second conductive wire 3b is wound along the circumference of the ferrite core 2 by a half turn. Also, the second conductive wire 3b is placed on top of the first conductive wire 3a which has already been wound around the ferrite core 2 by a half turn.

Figure 7E:
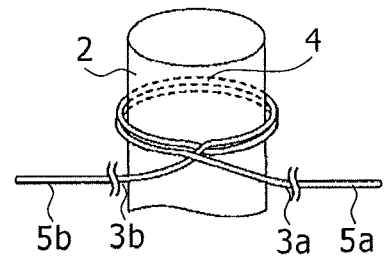

FIG. 7E shows a state in which the first conductive wire 3a is wound around the ferrite core 2 by one more turn. At this time, the first conductive wire 3a is wound around the circumference of the ferrite core 2 by one turn so as to be adjacent to the second conductive wire 3b wound around the ferrite core 2 to be placed on top of the second conductive wire 3b.

In addition, although not illustrated, after the second conductive wire 3b is disposed along the circumference of the ferrite core 2 to be also wound around the ferrite core 2 so as to be adjacent to the first conductive wire 3a wound by one turn, the second conductive wire 3b is placed on top of the first conductive wire 3a.

Figure 7F:
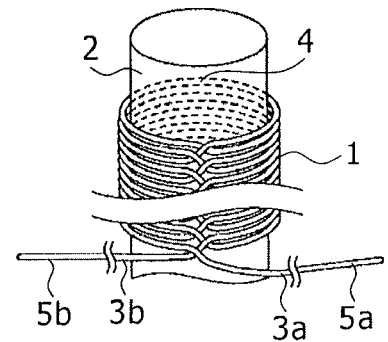

FIG. 7F shows the completed coil 1.

After the first conductive wire 3a and the second conductive wire 3b are repetitively wound around the ferrite core 2 by a predetermined number of turns, the first end portion 5a and the second end portion 5b of the conductive wire 3 are taken and used as both ends of the coil 1.

The conductive wire 3 is wound around the ferrite core 2 in the manner as described above, thereby forming the coil 1.

It is noted that although in the first and second embodiments described above, the ferrite core 2 is used as the core of the coil 1, 21, any other suitable material may be used instead of using the ferrite core 2. Further alternatively, the fixing portion (provided by the ferrite core 2, for example) may be removed from the coil 1, 21, thereby obtaining a hollow core coil. In addition, although the NPN bipolar transistor is used as the constituent element composing the oscillation circuit 13, the present invention is by no means limited thereto. In addition, a single wire may be used as the conductive wire 3 which is wound around the ferrite core 2 in order to obtain the coil 1, 21, or a plurality of fine conductive wires may be bundled for use in formation of the coil 1, 21. In addition, although in the first and second embodiments described above, for formation of the coil 1, 21, the first conductive wire 3a and the second conductive wire 3b are alternately wound around the ferrite core 2 so as to be adjacent to each other per each turn, alternatively, the first conductive wire 3a and the second conductive wire 3b may be alternately wound around the ferrite core 2 so as to be adjacent to each other per every two turns or more turns.

Figure 8:
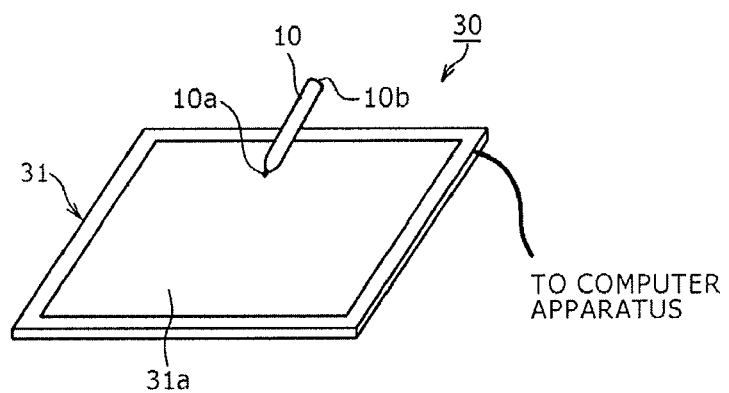
FIG. 8 is a perspective view showing an external appearance of a position detecting device (pen tablet) according to a third embodiment of the present invention.

FIG. 8 shows a position detecting device (hereinafter referred to as "a pen tablet") 30, according to a third embodiment of the present invention, including the position indicator 10 having the construction and operation as described above.

The pen tablet 30 has the pen-shaped position indicator 10, and a flat plate-like tablet 31. The pen-shaped position indicator 10 has the pen tip portion 10a, and the coil 1 is accommodated in the pen tip portion 10a.

The tablet 31 is connected to an external computer apparatus (not shown), and has a function of detecting an indicated position indicated by the position indicator 10. The position indicator 10 is used on a position detection area 31a set on an upper surface of the tablet 31. The tablet 31 can detect a coordinate position which is indicated on the position detection area 31a by the position indicator 10. Information regarding the indicated position indicated by the position indicator 10 and detected by the tablet 31 is outputted to the external computer apparatus. The external computer apparatus displays a drawing or the like corresponding to the coordinates inputted thereto from the tablet 31 on a screen of a liquid crystal display device (not shown) connected thereto.

Figure 9:
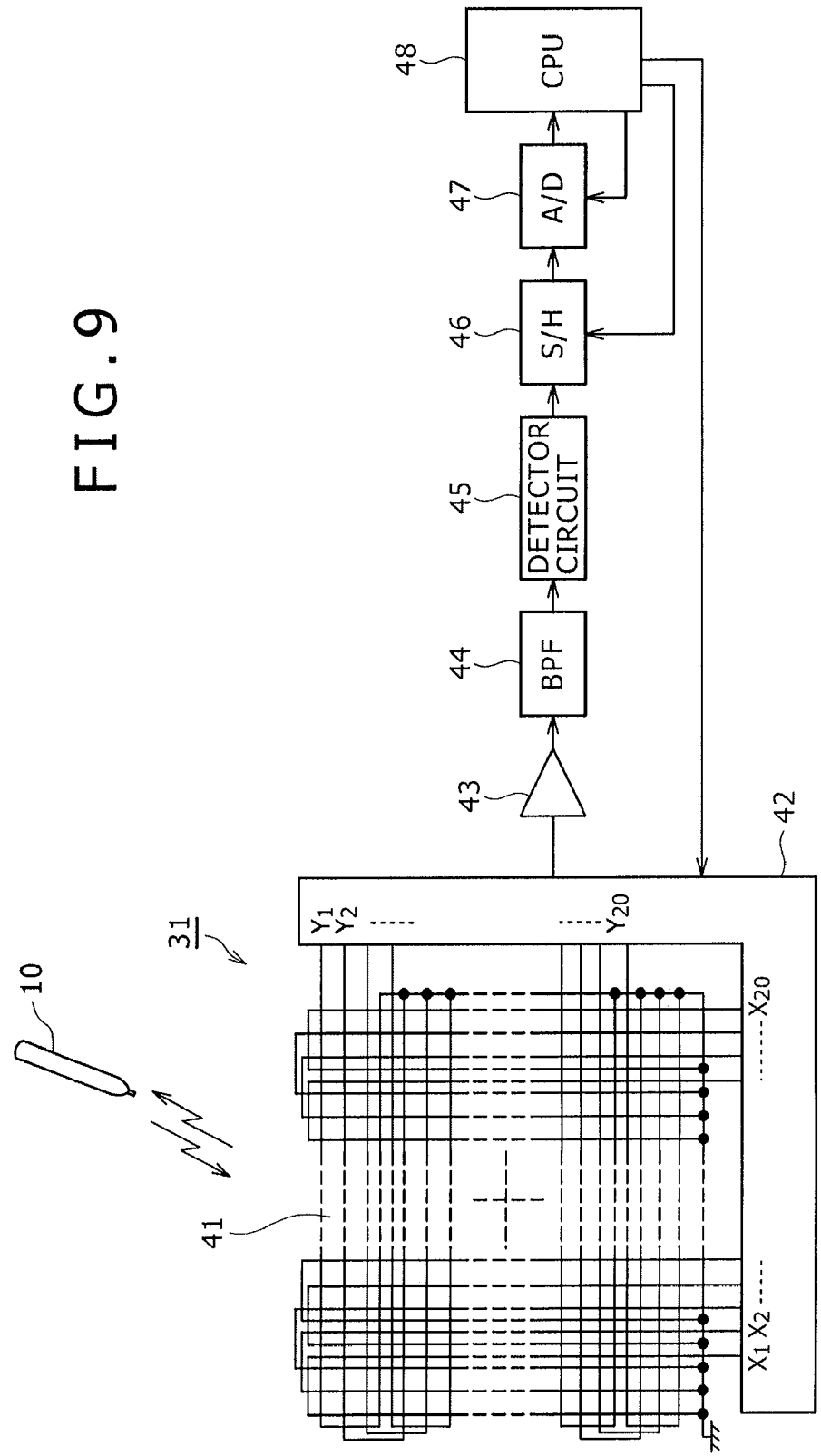
FIG. 9 is a block diagram showing an internal configuration of the pen tablet shown in FIG. 9.
Figure 10:
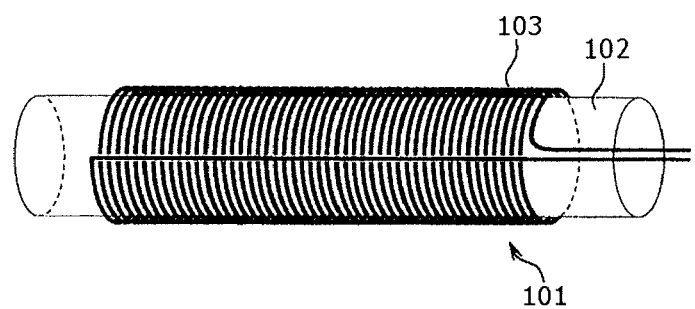
FIG. 10 is a view showing an external appearance of an existing coil.

FIG. 9 is a block diagram showing a configuration of the tablet 31.

The tablet 31 includes a plurality of loop coils 41. In this case, a plurality of loop coils 41 are composed of loop coils X1 to X20 which are disposed in an X-axis direction approximately in parallel with one another (hereinafter referred to as "X-axis loop coils"), and loop coils Y1 to Y20 which are disposed in a Y-axis direction approximately in parallel with one another (hereinafter referred to as "Y-axis loop coils"). The dimensions and pitch of the plurality of loop coils 41, of the position detection area 31a, composed of the X-axis loop coils X1 to X20 and the Y-axis loop coils Y1 to Y20, are determined according to the size of the tablet 31. The plurality of loop coils 41 receive the position indicating signal representing the indicated position indicated by the position indicator 10 from the position indicator 10 placed on the position detection area 31a. A plurality of loop coils 41 composed of the X-axis loop coils X1 to X20 and the Y-axis loop coils Y1 to Y20 are connected to a selecting circuit 42 for selecting a set of output terminals of the X-axis loop coil and the Y-axis loop coil which correspond to the indicated position on the position detection area 31a.

A set of output terminals of the X-axis loop coil and the Y-axis loop coil which is selected by the selecting circuit 42 is connected to an amplifying circuit 43. The amplifying circuit 43 is connected to a band-pass filter 44 having a frequency $f_o$, which is the frequency of the signal from the position indicator 10, as a central frequency. The band-pass filter 44 is connected to a detector circuit 45. The detector circuit 45 is connected to a sample-and-hold circuit 46. A voltage held by the sample-and-hold circuit 46 is converted from an analog signal into a digital signal in an A/D conversion circuit 47. The digital signal outputted from the A/D conversion circuit 47 is inputted to a CPU 48.

The CPU 48 sends control signals to the selecting circuit 42, the sample-and-hold circuit 46, and the A/D conversion circuit 47, respectively, and obtains the indicated position indicated by the position indicator 10 in the position detection area 31a in accordance with the position indicating signal received by corresponding ones of the X-axis loop coils X1 to X20 and the Y-axis loop coils Y1 to Y20 that form the loop coils 41.

With regard to an operation of the CPU 48, when there is no position indicator 10 on the tablet 31, the CPU 48 carries out the scanning for the entire tablet 31. Specifically, while the X-axis loop coils X1 to X20 and the Y-axis loop coils Y1 to Y20 are successively selected in the order from X1 to X20 and in the order from Y1 to Y20, respectively, on a one-by-one basis by the selecting circuit 22, the CPU 48 detects the presence or absence of, and the level of, each of the output signals from the X-axis loop coils X1 to X20 and the Y-axis loop coils Y1 to Y20, which are selected on the one-by-one basis, through the amplifying circuit 43, the detector circuit 45, the sample-and-hold circuit 46, and the A/D conversion circuit 47.

When the position indicator 10 is placed within the position detection area 31a by a user, the signals are detected from the corresponding ones of the X-axis loop coils X1 to X20 and the Y-axis loop coils Y1 to Y20 in the vicinity of the position indicator 10. When the signals are detected from the corresponding ones of the X-axis loop coils and the Y-axis loop coils that form the loop coils 41, the operation of the CPU 48 proceeds to the scanning of only several (about 5 to about 7) loop coils 41, which is centered around the loop coil from which the strongest signal was detected, with respect to both the X-axis loop coils and the Y-axis loop coils, respectively.

The operation of the CPU 48 described above is carried out for both the X-axis loop coils X1 to X20 and the Y-axis loop coils Y1 to Y20 forming the loop coils 41, and thus the results of detection of the levels of the signals from the X-axis loop coils X1 to X20 and the Y-axis loop coils Y1 to Y20 show a two-dimensional distribution. The position of the position indicator 10 on the pen tablet 30 is detected in accordance with the distribution of the levels of the signals.

In addition, a position detecting device according to a fourth embodiment of the present invention includes: the position indicator 10 including the coil 1 for radiating the magnetic field for carrying out the position indication; and the tablet 31 including the position detection area 31a for receiving position indication made by the position indicator 10. In this case, the tablet 31 serves to detect the position indicated by the position indicator 10 on the position detection area 31a in accordance with the magnetic field emitted from the position indicator 10. The coil 1 includes: the first conductive wire 3a wound from a distal end portion thereof to a proximal end portion thereof in a predetermined rotational direction; and the second conductive wire 3b wound from a proximal end portion thereof to a distal end portion thereof in the predetermined rotational direction.

It is noted that the position indicator 10 and the coil winding method of the present invention are embodied as described in the coils 1 and 21 of the first and second embodiments of the present invention.

The present invention is by no means limited to the embodiments described above and shown in the figures, and thus various kinds of changes can be made without departing from the subject matter of the present invention. For example, the oscillation circuit is by no means limited to the Colpitts type oscillation circuit and the Hartley type oscillation circuit.

It should be understood by those skilled in the art that various modifications, combinations, sub-combinations and alterations are possible depending on design requirements and other factors insofar as they are within the scope of the appended claims or the equivalents thereof.

What is claimed is:

1. A position indicator, comprising:
    an oscillation circuit configured to transmit a position indicating signal to indicate a position, the oscillation circuit including a coil comprising:
        a first conductive wire wound from a distal end portion thereof to a proximal end portion thereof in a predetermined rotational direction; and
        a second conductive wire wound from a proximal end portion thereof to a distal end portion thereof in the predetermined rotational direction, wherein
            said first conductive wire and said second conductive wire are connected to each other at the proximal end portions thereof, and
            said wound first conductive wire and said wound second conductive wire are disposed alternately adjacent to and in parallel with each other, such that the first and second conductive wires alternately cross over the second and first conductive wires, respectively, with electric currents passing in the same rotational direction through the alternately adjacent and parallel first and second conductive wires, to have electric fields respectively radiated from the first and second conductive wires cancel each other.

2. The position indicator according to claim 1, wherein said oscillation circuit includes two capacitors connected in series with each other; and
    said coil is connected in parallel with said two capacitors to form a resonance circuit, wherein in said resonance circuit, a middle point to which each of said two capacitors is connected is connected to a fixed potential, to configure a Colpitts type oscillation circuit.

3. The position indicator according to claim 1, wherein said oscillation circuit includes a capacitor which is connected to said coil, to form a resonance circuit; and
    a middle point of said coil is connected to a fixed potential, to configure a Hartley type oscillation circuit.

4. The position indicator according to claim 1, wherein said wound first conductive wire and said wound second conductive wire are disposed alternately per every turn.

5. A position detecting device, comprising:
    a position indicator including a coil for radiating a magnetic field for carrying out position indication; and
    a tablet including an input surface for receiving position indication made by said position indicator, said tablet being configured to detect a position indicated by said position indicator on said input surface in accordance with a magnetic field emitted from said position indicator;
    said coil including:
        a first conductive wire wound from a distal end portion thereof to a proximal end portion thereof in a predetermined rotational direction, and
        a second conductive wire wound from a proximal end portion thereof to a distal end portion thereof in the predetermined rotational direction,
        wherein said first conductive wire and said second conductive wire are connected to each other at the proximal end portions thereof, and wherein said wound first conductive wire and said wound second conductive wire are disposed alternately adjacent to and in parallel with each other, such that the first and second conductive wires alternately cross over the second and first conductive wires, respectively, with electric currents passing in the same rotational direction through the alternately adjacent and parallel first and second conductive wires, to have electric fields respectively radiated from the first and second conductive wires cancel each other.

6. The position detecting device of claim 5, wherein the tablet comprises a sensor coil made of a transparent conductive material disposed on a liquid crystal panel.

7. A position detecting device, comprising:
a position indicator including an oscillation circuit that includes a coil configured to emit a position indicating signal representing an indicated position; and
a tablet including an input surface for receiving position indication made by said position indicator, said tablet being configured to detect a position indicated by said position indicator on said input surface in accordance with a position indicating signal emitted from said position indicator;
said coil including a first conductive wire wound from a distal end portion thereof to a proximal end portion thereof in a predetermined rotational direction, and a second conductive wire wound from a proximal end portion thereof to a distal end portion thereof in the predetermined rotational direction, said first conductive wire and said second conductive wire being connected to each other at the proximal end portions thereof, said wound first conductive wire and said wound second conductive wire being disposed alternately adjacent to and in parallel with each other, such that the first and second conductive wires alternately cross over the second and first conductive wires, respectively, with electric currents passing in the same rotational direction through the alternately adjacent and parallel first and second conductive wires, to have electric fields respectively radiated from the first and second conductive wires cancel each other; and
said coil being configured to transmit the position indicating signal.

8. The position detecting device of claim 7, wherein the tablet comprises a sensor coil made of a transparent conductive material disposed on a liquid crystal panel.

9. A coil winding method, comprising the steps of:
designating a portion of a conductive wire from a predetermined point thereof to one end portion thereof as a first conductive wire, and designating another portion of the conductive wire from the predetermined point thereof to the other end portion thereof as a second conductive wire;
fixing said predetermined point of the conductive wire to a magnetic material having approximately a rod-like shape;
winding said first conductive wire by a half turn in a first rotational direction, and winding said second conductive wire by a half turn in a second rotational direction to thereby place said second conductive wire over said first conductive wire; and
alternately winding said first conductive wire and said second conductive wire to repetitively wind said first conductive wire and said second conductive wire such that said wound first conductive wire and said wound second conductive wire are disposed alternately adjacent to and in parallel with each other, such that the first and second conductive wires alternately cross over the second and first conductive wires, respectively, with electric currents passing in the same rotational direction through the alternately adjacent and parallel first and second conductive wires, to have electric fields respectively radiated from the first and second conductive wires cancel each other.

10. The coil winding method according to claim 9, wherein the step of alternately winding said first and second conductive wires comprises alternately winding said first conductive wire and said second conductive wire along the last-wound conductive wire per every turn.

11. The coil winding method according to claim 9, wherein the step of alternately winding said first and second conductive wires comprises alternately winding said first conductive wire and said second conductive wire per every two or more turns.

12. The coil winding method according to claim 9, further comprising the step of, after repetitively winding said first and second conductive wires by a predetermined number of turns, taking both end portions of the conductive wire as both ends of the coil.

* * * * *